(12) United States Patent   (10) Patent No.: US 8,965,609 B2
Takagi   (45) Date of Patent: Feb. 24, 2015

(54) ELECTRIC VEHICLE

(75) Inventor: Izumi Takagi, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 245 days.

(21) Appl. No.: 13/340,539

(22) Filed: Dec. 29, 2011

(65) Prior Publication Data

US 2013/0173100 A1     Jul. 4, 2013

(51) Int. Cl.
*G05D 17/02*     (2006.01)
(52) U.S. Cl.
CPC ............. *G05D 17/02* (2013.01); *Y10S 903/916* (2013.01); *Y10S 903/93* (2013.01)
USPC ................... 701/22; 701/65; 701/71; 701/72; 701/74; 701/75; 701/81; 701/82; 701/89; 701/90; 180/65.1; 180/65.265; 180/65.285; 180/65.6; 180/197; 180/233; 180/242; 903/916; 903/930

(58) Field of Classification Search
CPC .................................................... G05D 17/02
USPC ........... 701/22, 65, 71, 72, 74, 75, 81, 82, 89, 701/90; 903/930, 916; 180/65.265, 65.1, 180/65.285, 65.6, 197, 233, 242
See application file for complete search history.

(56) References Cited

U.S. PATENT DOCUMENTS

| 4,973,289 | A | * | 11/1990 | Leonard | 474/49 |
|---|---|---|---|---|---|
| 4,973,296 | A | * | 11/1990 | Shibahata | 475/231 |
| 5,259,476 | A | * | 11/1993 | Matsuno et al. | 180/197 |
| 5,287,941 | A | * | 2/1994 | Masuda et al. | 180/197 |
| 5,346,032 | A | * | 9/1994 | Sasaki | 180/233 |
| 5,453,930 | A | * | 9/1995 | Imaseki et al. | 701/22 |
| 5,539,399 | A | * | 7/1996 | Takahira et al. | 340/995.27 |
| 5,549,172 | A | * | 8/1996 | Mutoh et al. | 180/65.1 |
| 6,205,379 | B1 | * | 3/2001 | Morisawa et al. | 701/22 |
| 6,295,487 | B1 | * | 9/2001 | Ono et al. | 701/22 |
| 6,549,840 | B1 | * | 4/2003 | Mikami et al. | 701/69 |
| 7,392,875 | B2 | * | 7/2008 | Matsuzaki | 180/247 |
| 7,806,218 | B2 | * | 10/2010 | Kubo | 180/233 |
| 7,920,952 | B2 | * | 4/2011 | Miura et al. | 701/70 |
| 8,738,207 | B2 | * | 5/2014 | Holmes et al. | 701/22 |
| 8,849,538 | B2 | * | 9/2014 | Kato et al. | 701/84 |
| 2002/0087252 | A1 | * | 7/2002 | Shimizu et al. | 701/84 |
| 2002/0123409 | A1 | * | 9/2002 | Suzuki et al. | 477/3 |
| 2003/0098185 | A1 | * | 5/2003 | Komeda et al. | 180/65.2 |
| 2005/0150702 | A1 | * | 7/2005 | Matsuzaki | 180/197 |
| 2006/0076740 | A1 | * | 4/2006 | Sugiyama | 280/5.502 |
| 2006/0196714 | A1 | * | 9/2006 | Sugimoto et al. | 180/242 |
| 2006/0201730 | A1 | * | 9/2006 | Kaneko et al. | 180/243 |

(Continued)

FOREIGN PATENT DOCUMENTS

| CN | 101386303 | A | * | 3/2009 |
|---|---|---|---|---|
| JP | 3678053 | | | 5/2005 |

*Primary Examiner* — Calvin Cheung
*Assistant Examiner* — Angelina Shudy
(74) *Attorney, Agent, or Firm* — Alleman Hall McCoy Russell & Tuttle LLP

(57) ABSTRACT

An electric vehicle is presented. The electric vehicle may include a front motor for driving a front wheel; a rear motor for driving a rear wheel; a target torque determiner for determining a target torque of the front motor and a target torque of the rear motor, based on at least a displacement amount of an accelerator operation member operated by a driver; and a motor controller for controlling the front motor and the rear motor to cause the front motor to output the target torque and the rear motor to output the target torque.

14 Claims, 6 Drawing Sheets

(56) References Cited

U.S. PATENT DOCUMENTS

| | | | |
|---|---|---|---|
| 2006/0237239 A1* | 10/2006 | Bruner et al. | 180/6.7 |
| 2007/0260386 A1* | 11/2007 | Tandy et al. | 701/70 |
| 2007/0282512 A1* | 12/2007 | Hoeck et al. | 701/71 |
| 2008/0056687 A1* | 3/2008 | Moriki et al. | 388/801 |
| 2009/0024294 A1* | 1/2009 | Ishida et al. | 701/87 |
| 2009/0192710 A1* | 7/2009 | Eidehall et al. | 701/301 |
| 2009/0230761 A1* | 9/2009 | Sekiguchi et al. | 303/2 |
| 2010/0049390 A1* | 2/2010 | Supina et al. | 701/22 |
| 2010/0250083 A1* | 9/2010 | Takahashi et al. | 701/70 |
| 2010/0292882 A1* | 11/2010 | Murata | 701/22 |
| 2012/0016573 A1* | 1/2012 | Ellis | 701/112 |
| 2012/0046846 A1* | 2/2012 | Dollens | 701/99 |
| 2012/0166055 A1* | 6/2012 | Ozawa | 701/69 |
| 2012/0191282 A1* | 7/2012 | Maki | 701/22 |
| 2013/0030602 A1* | 1/2013 | Joeng | 701/1 |
| 2013/0090791 A1* | 4/2013 | Yeh et al. | 701/22 |
| 2013/0149093 A1* | 6/2013 | Kaneko et al. | 414/685 |
| 2013/0197772 A1* | 8/2013 | Brand | 701/82 |
| 2013/0204504 A1* | 8/2013 | Bieniek et al. | 701/82 |

\* cited by examiner

ELECTRIC VEHICLE

BACKGROUND OF THE INVENTION

1. Field of the Invention

The present invention generally relates to an electric vehicle including a front electric motor for driving a front wheel and a rear electric motor for driving a rear wheel. Particularly, the present invention relates to control of the front electric motor and the rear electric motor.

2. Description of the Related Art

Conventionally, as electric vehicles, there are electric vehicles including only an electric motor as a driving power source, hybrid vehicles including an engine and a motor, etc. In these electric vehicles, a single motor is provided to drive one of either front wheel(s) or rear wheel(s), a front motor and a rear motor are provided to drive front wheel(s) and rear wheel(s), respectively, or motors are provided to correspond to right and left front wheels and right and left rear wheels, respectively, in one-to-one correspondence (wheel-in type).

For example, Japanese Patent No. 3678053 discloses a technique in which in an electric vehicle configured such that a front motor and a rear motor drive front wheels and rear wheels, respectively, a speed reduction ratio from the front motor to the front wheels is made different from a speed reduction ratio from the rear motor to the rear wheels, and the vehicle is actuated by using only the motor corresponding to a lower speed reduction ratio under a smaller driving load, thereby lessening a transmission loss of a driving power.

However, in the above conventional example in which the electric vehicle is configured to be actuated by using only one of the motors depending on the driving load, if a wheel slip occurs in a slippery road surface condition such as a snowy road surface or a sandy road surface condition in which a friction coefficient is very low, the driving load is reduced, and as a result, the electric vehicle may possibly be actuated by only one of the motors. In other words, four-wheel-drive capability of the vehicle cannot be effectively used, and driving mobility of the vehicle degrades.

In addition, if the driver is depressing an accelerator pedal to move the vehicle forward, the two wheels which are the front wheels or the rear wheels are slipping, but the remaining two wheels are locked, which make the driver feel discomfort.

SUMMARY OF THE INVENTION

The present invention address the above described condition, and an object of the present invention is to improve driving mobility on unpaved road surfaces and to provide a natural driving feeling in an electric vehicle including motors for driving front and rear wheels, respectively.

An electric vehicle of the present invention comprises a front motor for driving a front wheel; and a rear motor for driving a rear wheel; a target torque determiner for determining a target torque of the front motor and a target torque of the rear motor, based on at least a displacement amount of an accelerator operation member operated by a driver; and a motor controller for controlling the front motor and the rear motor to cause the front motor to output the target torque and the rear motor to output the target torque.

In accordance with this configuration, the target torque determiner determines the target torque of the front motor and the target torque of the rear motor individually, based on at least the displacement amount of the accelerator operation member, and the front motor and the rear motor are independently respectively controlled to output their target torques. Thereby, if a wheel slip occurs in a road surface condition such as a snowy road surface condition or a sandy road surface condition, in which a friction coefficient is very low, an event that the vehicle is driven by only one of the front and rear motors will not occur. As a result, driving mobility unique to the four-wheel-drive-vehicle is attained.

Since the target torque of the front motor and the target torque of the rear motor are determined independently, if one of the front wheel and the rear wheel slips, the driving force applied to the other wheel which is not slipping does not decrease undesirably. Thus, driving mobility of the electric vehicle is enhanced. In addition, since the driving force is fundamentally applied to the front wheel and to the rear wheel in response to, for example, the driver's depressing operation of the accelerator operation member, a natural driving feeling is attained.

The above and further objects, features and advantages of the invention will more fully be apparent from the following detailed description with reference to the accompanying drawings.

DETAILED DESCRIPTION OF THE PREFERRED EMBODIMENTS

Figure 1:
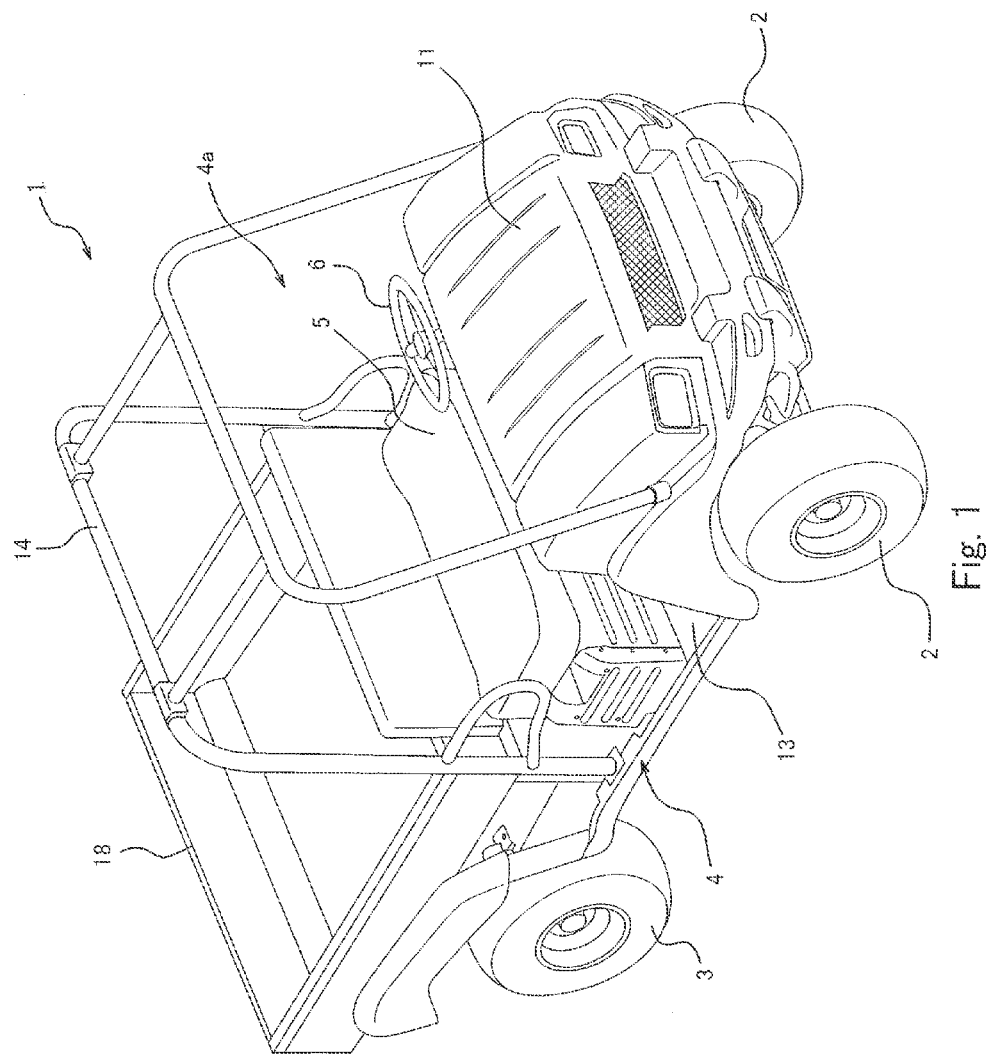
FIG. 1 is a perspective view of a hybrid vehicle according to an embodiment of the present invention, when viewed from leftward and obliquely forward.

Hereinafter, an embodiment of the present invention will be described with reference to the drawings. Throughout the drawings, the same or corresponding components are identified by the same reference numerals and will not be described in repetition. The stated directions are referenced from the perspective of a driver riding in the electric vehicle.

Figure 2:
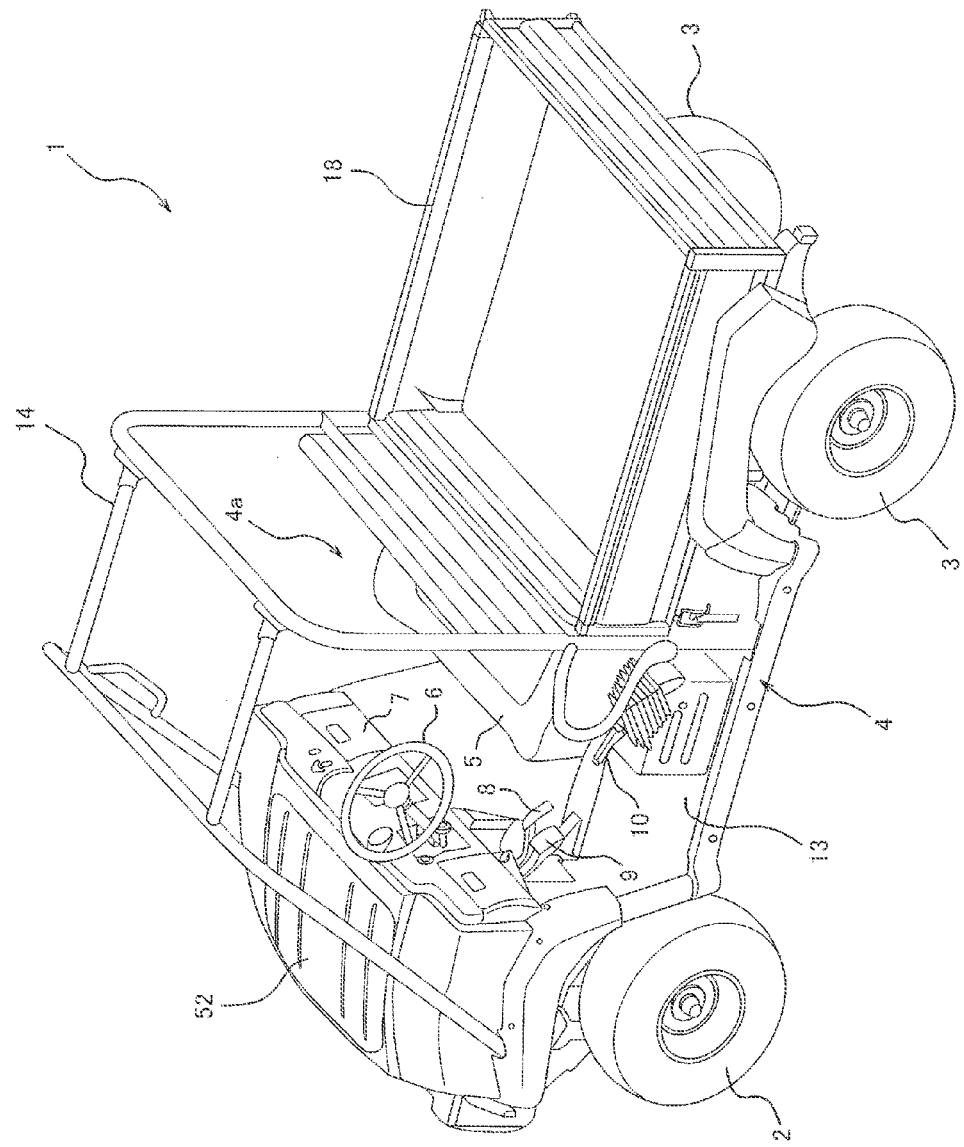
FIG. 2 is a perspective view of the hybrid vehicle when viewed from rightward and obliquely rearward.
Figure 3:
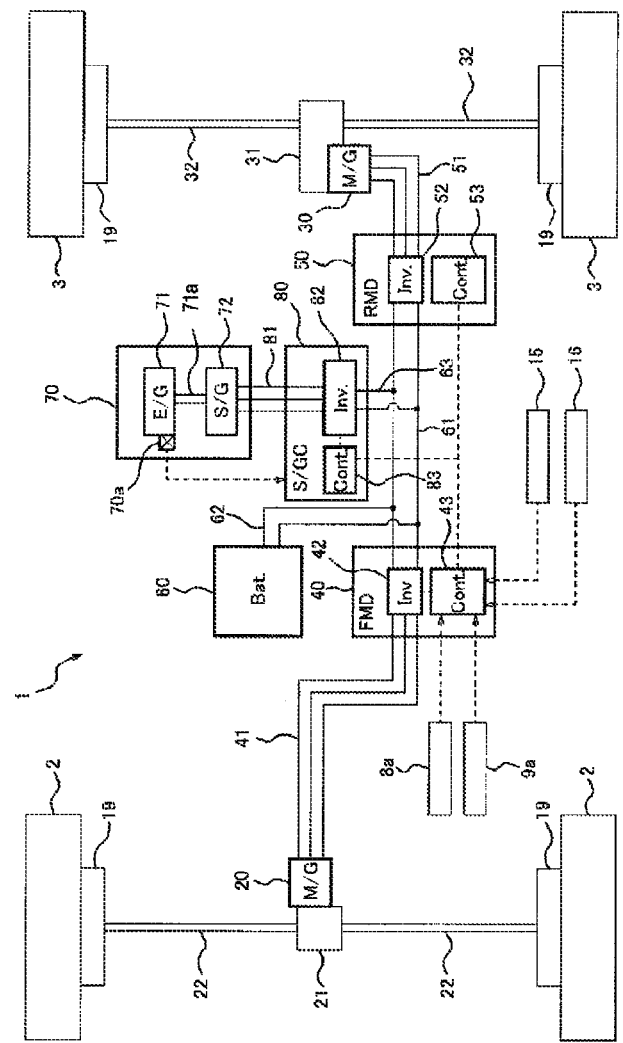
FIG. 3 is a block diagram schematically showing a drive control system in the hybrid vehicle.

FIGS. 1 and 2 are perspective views of an external appearance of a utility vehicle 1 which is an embodiment of the electric vehicle according to the present invention. FIG. 3 is a block diagram schematically showing a drive control system in the utility vehicle 1. Referring to FIGS. 1 and 2, the utility vehicle 1 includes right and left front wheels 2 attached with balloon tires (low-pressure tires), right and left rear wheels 3 attached with balloon tires (low-pressure tires), and a vehicle body 4 from which the wheels 2 and 3 are suspended. A cabin space 4a for passengers is provided in a center portion of the vehicle body 4 in a forward and rearward direction (lengthwise direction of the utility vehicle 1). A bench seat 5 (driver seat) which is laterally elongated is provided in a substantially center portion of the wheel bases of the front and rear wheels 2 and 3. As used herein, the utility vehicle refers to a multipurpose vehicle, for example, a golf cart, a farming truck, etc.

The front wheels 2 of the utility vehicle 1 are steering wheels and are turned to the right or to the left according to driver's steering of the handle 6. As shown in FIG. 2, the handle 6 is supported on a handle post extending upward from the dash board 7 such that it is tilted slightly rearward. Below the handle 6, an accelerator pedal 8 and a brake pedal 9 are provided. The driver seated on a left portion of the seat 5 can depress the accelerator pedal 8 or the brake pedal 9, while gripping the handle 6. A side brake lever 10 is provided in the vicinity of the left end of the seat 5 to allow the driver to easily operate the side brake lever 10 with a left hand.

The front portion of the vehicle body which is forward relative to the cabin space 4a is covered with a hood 11 extending forward from the upper end of the dash board 7. Below the hood 11, there are provided front suspension devices which suspend the right and left front wheels 2 such that the right and left front wheels 2 are vertically pivotable, and a steering device for turning the front wheels 2 according to the driver's steering of the handle 6. In addition, below the hood 11, there is provided a drive system for actuating the front wheels 2 by an electric front motor 20 (front motor), as will be described later with reference to FIG. 3.

A floor panel 13 extends rearward from the lower end of the dash board 7 in the cabin space 4a. A cabin frame 14 is provided above the floor panel 13. The cabin frame 14 serves as a roll cage (ROPS). In the present embodiment, a substantially left part of a space surrounded by the cabin frame 14 is a space for the driver. As described above, the handle 6 is attached on the left portion of the dash board 7. In addition, driving operation devices such as a key switch 15, a mode input device 16, and the like, are attached on the left portion of the dash board 7 and positioned to enable the driver to manipulate them easily.

The key switch 15 is a main switch for turning ON/OFF a power supply of the utility vehicle 1. The mode input device 16 is operated by the driver to select a driving mode of the utility vehicle 1. Exemplary driving modes are an electric vehicle (EV) mode in which the utility vehicle 1 drives only by electric power supplied from a battery unit (Bat.) 60, and a hybrid vehicle (HV) mode in which the utility vehicle 1 receives electric power from an engine electric generator (E/G) 70, in addition to the battery electric power, as described later, but another driving mode may be used. The mode input device 16 may be implemented by, for example, a press button, a toggle switch, or a rocker switch.

A cargo bed 18 is provided behind and in close proximity to the cabin space 4a. Below the cargo bed 18, there are provided rear suspension devices which suspend the right and left rear wheels 3 such that the right and left rear wheels 3 are vertically pivotable, and a drive system for actuating the rear wheels 3 by an electric rear motor 30 (rear motor), as will be described with reference to FIG. 3. Below the cargo bed 18, an engine room (not shown) is provided, and accommodates the engine electric generator 70, and motor drivers 40 and 50 for controlling electric power supply to the front motor 20 and the rear motor 30, respectively, as described later.

—Configuration of Drive Control System—

Referring to FIG. 3, the utility vehicle 1 is a four-wheel-drive vehicle in which the front wheels 2 are actuated by the front motor 20 and the rear wheels 3 are actuated by the rear motor 30. Note that a front wheel drive system for actuating the front wheels 2 is not coupled mechanically to a rear wheel drive system for actuating the rear wheels 3. A driving power of the front motor 20 is transmitted to the right and left front wheels 2 via a front axle 21 having a reduction gear pair and a differential gear mechanism (not shown) and a pair of drive shafts 22. Likewise, a driving power of the rear motor 30 is transmitted to the right and left rear wheels 3 via a rear transaxle 31 and a pair of drive shafts 32.

A service brake 19 constituted by, for example, a drum brake is provided for each of the front wheels 2 and the rear wheels 3. In response to the driver's depressing operation of the brake pedal 9, a hydraulic brake pressure generated in a master cylinder is fed to each of the service brakes 19 corresponding to the right and left front wheels 2 and to each of the service brakes 19 corresponding to the right and left rear wheels 3, and a braking force is applied to the front wheels 2 and the rear wheels 3, although a hydraulic system is not shown. In the present embodiment, as the service brakes 19 for the front wheels 2 and the rear wheels 3, drum brake units are used, which achieves cost reduction.

The motor drivers 40 and 50 for actuating the front and rear motors 20 and 30, respectively, are accommodated below the cargo bed 18 as described above. The battery unit 60 for supplying the electric power to the motor drivers 40 and 50 is accommodated in the cabin space 4a, below the seat 5, for example. The front motor driver 40 (FMD) converts DC power into three-phase AC power and supplies the three-phase AC power to the front motor 20 via three-phase lines 41. The rear motor driver 50 (RMD) converts DC power into three-phase AC power and supplies the three-phase AC power to the rear motor 30 via three-phase lines 51. The motors 20 and 30 are constituted by, for example, three-phase induction electric motors, and each of them is a motor/generator (M/G) which is capable of switching between a motor operation and a power generation operation.

In the present embodiment, the motor drivers 40 and 50 have basically the same configuration. Therefore, the front motor driver 40 will be described in detail. Although not depicted in detail, the front motor driver 40 includes an inverter 42 constituted by a three-phase (u-phase, v-phase, w-phase) bridge circuit, and a controller 43 for controlling the ON/OFF operation of each switching element (IGBT, etc.). The controller 43 controls the inverter 42 by, for example, PWM (pulse-width modulation) control so that the inverter 42 converts the DC power supplied from the battery unit 60 into AC power and outputs the AC power with a phase difference of 120 degrees through output terminals of u-phase, v-phase and w-phase. The controller 43 also controls the amplitude and frequency of the AC power.

By the AC power supplied from the front motor driver 40 in the above manner, the front motor 20 is actuated, to drive the right and left front wheels 2 via the transaxle 21 and the drive shafts 22. In the front motor driver 40, the controller 43 performs the PWM control of the inverter 42, to control the amplitude and frequency of the AC power, and hence the output torque and output rotational speed of the front motor 20, i.e., the driving torque and rotational speed of the front wheels 2. In the same manner, in the rear motor driver 50, the controller 53 performs the PWM control of the inverter 52, to control the amplitude and frequency of the AC power, and hence the driving torque and output rotational speed of the rear motor 30, i.e., the driving torque and rotational speed of the rear wheels 3.

When the utility vehicle 1 is accelerated, during driving of the utility vehicle 1, the output torque and rotational speed of the front motor 20 and the output torque and rotational speed of the rear motor 30 are increased by the front motor driver 40 and the rear motor driver 50, respectively, in response to at least the degree (accelerator displacement amount or level) to which the accelerator pedal 8 is depressed by the driver, as described later. As a result, the driving torque of the front wheels 2 and the driving torque of the rear wheels 3 increase, the rotational speeds of them, and hence the vehicle speed of the utility vehicle 1 increase.

When the utility vehicle 1 is decelerated, the output torque and rotational speed of the front motor 20 and the output torque and rotational speed of the rear motor 30 are decreased by the front motor driver 40 and the rear motor driver 50, respectively. Thereby, the front motor 20 is rotated by the force applied by the front wheels 2 and the rear motor 30 is rotated by the force applied by the rear wheels 3 to perform regenerative braking. In regenerative braking, the front motor 20 and the rear motor 30 operate as AC electric generators. The AC power generated in the front motor 20 is sent to the inverter 42 via the AC lines 41 and is converted into the DC power charged into the battery unit 60, while the AC power generated in the rear motor 30 is sent to the inverter 52 via the AC lines 51 and is converted into the DC power charged into the battery unit 60.

To be specific, as shown in FIG. 3, the inverter 42 of the front motor driver 40 and the inverter 52 of the rear motor driver 50 are coupled together via first DC lines 61 and are coupled to the battery unit 60 via second DC lines 62 connected to a portion of the first DC lines 61. In this way, the DC power is allowed to flow among the inverter 42, the inverter 52, and the battery unit 60 according to terminal voltages, respectively, via the first DC lines 61 or the second DC lines 62 coupling the inverters 42 and 53 and the battery unit 60.

The battery unit 60 is a secondary battery pack of, for example, a lead storage battery, a nickel-metal hydride battery, or a lithium ion battery. The battery unit 60 is composed of a plurality of battery modules connected in series or in parallel (not shown), and provides a voltage and capacity required for actuating the utility vehicle 1. A terminal voltage of the whole battery unit 60 is set to, for example, 45~50V. To protect passengers from a high voltage, the DC lines 61 and 62 are in a floating condition in which they are insulated from a body earth of the utility vehicle 1.

In the present embodiment, for example, a current sensor 62a and a voltage sensor 62b are attached on the second DC lines 62 to detect a value of a current and terminal voltages during charging/discharging of the battery unit 60. As described later, in the present embodiment, the output of the current sensor 62a and the output of the voltage sensor 62b are sent to the controller 43 of the front motor driver 40, which calculates the value of a state of charge (SOC), etc., based on the detected current value and the detected voltage value.

In the present embodiment, the utility vehicle 1 is a hybrid vehicle, which includes the engine electric generator 70 for supplying the electric power to the front motor 20, the rear motor 30 and the battery unit 60. For example, the engine electric generator 70 includes an electric generator 72 and a reciprocating engine 71 and has a unitary structure in which the electric generator 72 is coupled integrally with the end portion of a crankshaft 71a of the reciprocating engine 71. The engine 71 is started according to the value of the SOC of the battery unit 60 and actuates the electric generator 72.

For example, the electric generator 72 is a three-phase induction electric generator which is capable of switching between a motor operation and a power generation operation. The electric generator 72 is a starter/generator (S/G) which functions as a starter of the engine 71 during the motor operation. The electric generator 72 is coupled to an inverter 82 of an S/G controller 80 (S/GC) via three-phase (u-phase, v-phase, w-phase) AC lines 81. The inverter 82 is coupled to the first DC lines 61 via third DC lines 63, respectively. At the start of the engine 71, the inverter 82 is controlled by the controller 83 to supply the three-phase AC power to the electric generator 72 via the AC lines 81, thereby allowing the electric generator 72 to operate as a motor.

Upon the engine 71 starting, the electric generator 72 actuated by the engine 71 generates AC power, which is sent to the inverter 82 of the S/G controller 80, via the AC lines 81. The inverter 82 converts the AC power into DC power, which is sent to the third DC lines 63. Then, the DC power flows to the first DC lines 61 through the third DC lines 63. The inverter 42 of the front motor driver 40 and the inverter 52 of the rear motor driver 50 convert the DC power into the three-phase AC power, which is used to actuate the front motor 20 and the rear motor 30. The DC power flowing through the first DC lines 61 and then the second DC lines 62 is charged into the battery unit 60.

In the present embodiment, the engine 71 of the engine electric generator 70 is, for example, a gasoline engine, and includes a carburetor (not shown) including a throttle valve which throttles a flow of intake air. By changing the opening degree of the throttle valve, the amount of an air-fuel mixture suctioned into a cylinder of the engine 71 changes, and an engine driving power output changes. An actuator for opening and closing the throttle valve is controlled by the controller 83 of the S/G controller 80. The controller 83 also controls feeding of fuel to the carburetor, and ignition of the air-fuel mixture in the cylinder.

As described above, in the present embodiment, in the engine room below the cargo bed 18, the engine electric generator 70, the rear motor 30, and the rear transaxle 31 are accommodated. In addition, the front motor driver 40, the rear motor driver 50, and the S/G controller 80 are accommodated in the engine room. Because of this layout, by displacing the cargo bed 18 upward, maintenance of mechanical components such as the engine electric generator 70, the rear motor 30, and the rear transaxle 31 is carried out easily, and maintenance of the motor drivers 40 and 50 and the S/G controller 80 which are subjected to a high voltage, is carried out easily. The engine electric generator 70, which tends to elevate its temperature, is positioned at a right part of the engine room, and the motor drivers 40 and 50, and the S/G controller 80 are positioned at a left part of the engine room in order to prevent the motor drivers 40 and 50, and the S/G controller 80 from being damaged by heat radiated from the engine electric generator 70.

—Driving Action Control of Utility Vehicle—

In the driving action control of the utility vehicle 1 which is performed by the drive control system having the above described configuration, the motors 20 and 30 are controlled by using the inverters 42 and 52 of the front and rear motor drivers 40 and 50, respectively, and the engine electric generator 70 is activated as necessary. In the present embodiment, the controller 43 of the front motor driver 40 and the controller 53 of the rear motor driver 50 are connected interactively to the controller 83 of the S/G controller 80 via CAN (control area network), which realizes total control.

To be specific, each of the three controllers 43, 53, and 83 is basically constituted by a known microcontroller, and includes a CPU for executing programs, memories such as RAM or ROM, I/O bus, etc. In the present embodiment, hereinafter, it is assumed that the controller 43 of the front motor driver 40 is a master controller, and performs predetermined calculation based on the outputs of sensors indicating vehicle states. Then, the controller 43 (hereinafter referred to as master controller 43) outputs control commands to the controller 53 of the rear motor driver 50 and to the controller 83 of the S/G controller 80, respectively.

Figure 4:
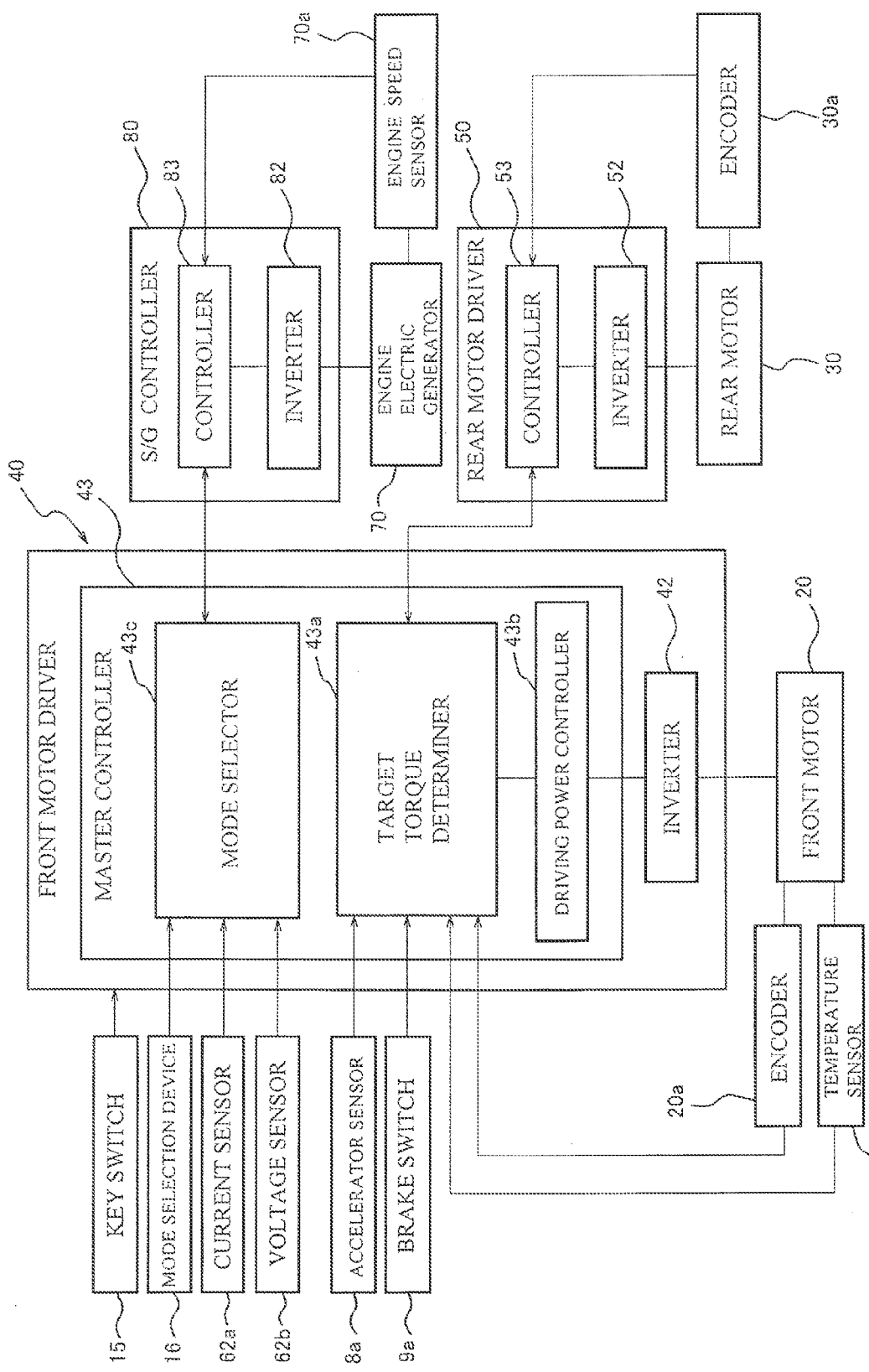
FIG. 4 is a block diagram showing a configuration of major components of the drive control system in the hybrid vehicle.

To be specific, as shown in FIG. 4, the master controller 43 receives, as inputs of information indicating the driver's operation, a signal from an accelerator sensor 8a for detecting the degree (accelerator displacement amount) to which the accelerator pedal 8 has been depressed by the driver, a signal from a brake switch 9a for detecting the degree (brake displacement amount) to which the brake pedal 9 has been depressed by the driver, a signal from the key switch 15, a signal from the mode selection device 16, etc. In addition, the master controller 43 receives as inputs a signal from the current sensor 62a attached on the second DC line 62, a signal from the voltage sensor 62b attached on the second DC line 62, a signal from an encoder 20a built into the front motor 20, and a signal from a temperature sensor 20b (e.g., temperature sensor for detecting a hall IC temperature of the front motor 20) built into the front motor 20, etc.

A signal from an encoder 30a built into the rear motor 30 is inputted to the controller 53 of the rear motor driver 50, and then is sent from the controller 53 to the master controller 43 as a signal indicating the rotational speed of the rear motor 30. In the above described manner, the sensors, the switches and others for controlling driving action of the utility vehicle 1 are coupled to the master controller 43 directly or indirectly via CAN. The signals from the sensors and the switches are inputted to the master controller 43.

The master controller 43 controls the motors 20 and 30 by using the inverters 42 and 52 based on the signals from the sensors and the switches so that the utility vehicle 1 drives, in response to the driver's operation. The master controller 43 includes a target torque determiner 43a for determining a target torque of the front motor 20 and a target torque of the rear motor 30, based on at least the signal from the accelerator sensor 8a, the signal from the brake switch 9a, the signal from the encoder 20a built into the front motor 20, and the signal from the encoder 30a built into the rear motor 30.

The master controller 43 includes a driving power controller 43b which performs PWM (pulse-width modulation) control of the inverter 42 based on a target torque value of the front motor 20 so that the front motor 20 outputs the target torque. The target torque determiner 43a outputs a target torque value of the rear motor 30 to the controller 53 of the rear motor driver 50. Receiving the target torque value, the controller 53 controls the inverter 52 so that the output torque of the rear motor 30 reaches the target torque.

The inverter 42 of the motor driver 40 controls the amplitude or the like of the AC power supplied to the front motor 20 based on the target torque value determined by the target torque determiner 43a of the master controller 43, while the inverter 52 of the motor driver 50 controls the amplitude or the like of the AC power supplied to the rear motor 30 based on the target torque value determined by the target torque determiner 43a of the master controller 43. In this way, the torque of the front motor 20 and the torque of the rear motor 30 are individually controlled. In other words, the inverter 42 of the motor driver 40 and the inverter 52 of the motor driver 50 respectively operate as motor controllers for controlling the front motor 20 and the rear motor 30, respectively so that the front motor 20 and the rear motor 30 output their target torques.

In the present embodiment, the master controller 43 includes a mode selector 43c for selecting a driving mode of the utility vehicle 1, based on a signal from the mode selection device 16, the value of the SOC of the battery unit 60, etc. The mode selector 43c fundamentally selects the EV mode or the HV mode based on the signal from the mode input device 16. The mode selector 43c selects the HV mode if the value of the SOC of the battery unit 60 is lower than a predetermined lower limit value. The mode selector 43c outputs a mode selection command to the S/G controller 80. Receiving this mode selection command, the controller 83 controls the operation of the engine electric generator 70.

The engine electric generator 70 is attached with an engine speed sensor 70a for detecting the engine speed of the engine 71 and the rotational speed of the electric generator 72. The signal output from the engine speed sensor 70a is input to the controller 83 of the S/G controller 80. Based on the signal from the engine speed sensor 70a, the controller 83 controls the opening degree of the throttle valve of the engine 71 so that the engine speed reaches a target engine speed. The target engine speed may be set to a value near a rated engine speed preliminarily, but may be provided as a control command from the master controller 43 based on the vehicle state of the utility vehicle 1.

Hereinafter, a specific procedure of the driving action control of the utility vehicle 1 of the present embodiment will be described with reference to the flowchart of FIG. 5. When the key switch 15 of the utility vehicle 1 is turned ON, the contactors are closed, and the electric power starts to flow between the battery unit 60 and the motor drivers 40 and 50. Thereupon, the control procedure starts. This control procedure is repeated until the key switch 15 is turned OFF.

—Driving Action Control of Front and Rear Motors—

Figure 5:
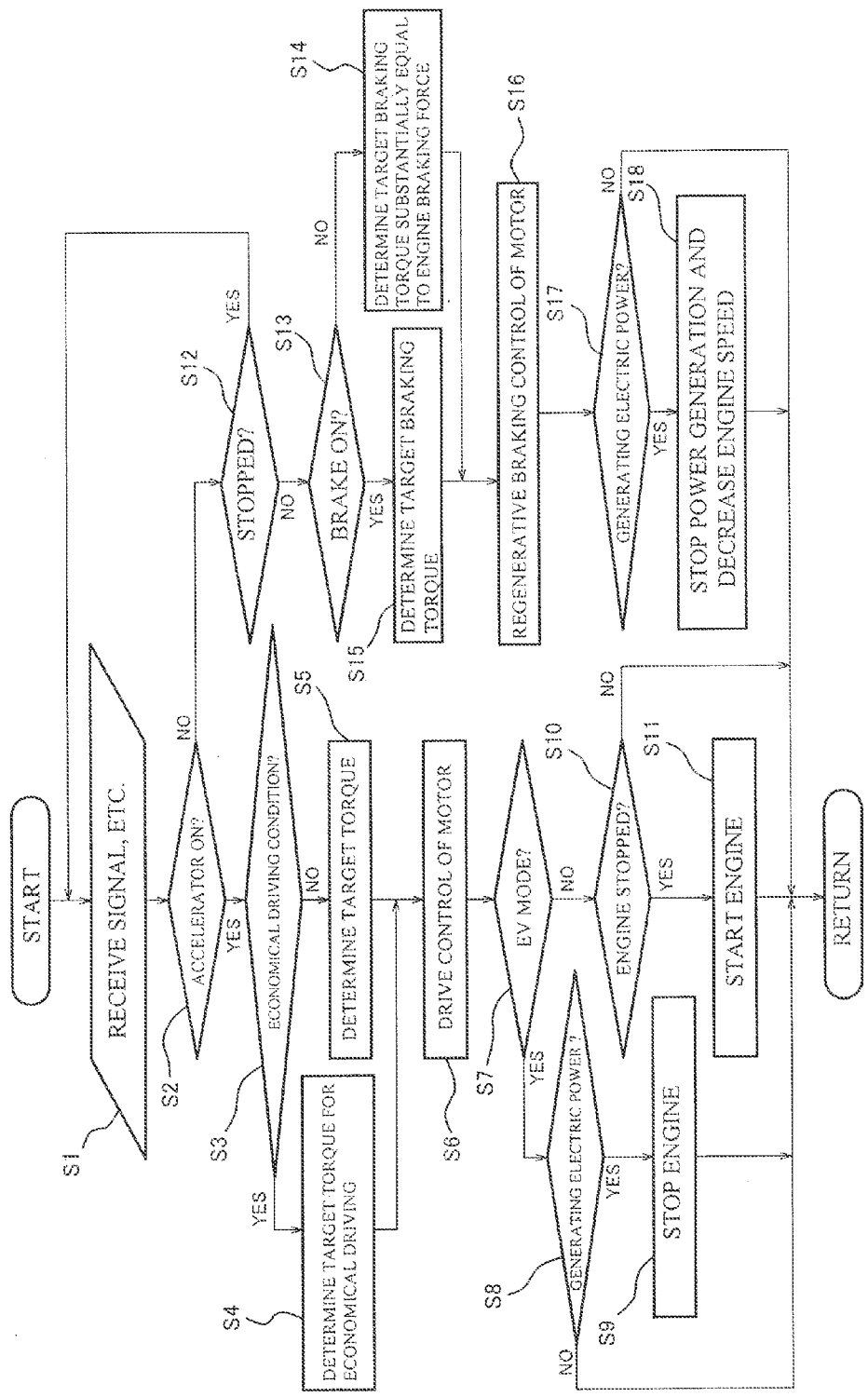
FIG. 5 is a flowchart of driving action control in which the hybrid vehicle is driven by the drive control system.

Referring to the flowchart of FIG. 5, after the start, the master controller 43 receives the signals from the sensors and the switches 8a, 9a, 15, etc., and reads data from a predetermined area of the memory as necessary (step S1). The master controller 43 determines whether or not the accelerator pedal 8 has been depressed based on the signal from the accelerator sensor 8a (step S2: accelerator ON?). If NO in step S2, the process moves to steps S12~S18 as described later. On the other hand, if YES in step S2, in step S3, the master controller 43 determines whether or not a condition (hereinafter referred to as an economical driving condition) used for driving the utility vehicle 1 by using only either one of the motors 20 and 30 is met.

In step S3, the master controller 43 determines that the economical driving condition is met at least either when a remaining driving distance of the utility vehicle 1 (a distance over which the utility vehicle 1 is going to travel from now on) is not more than a preset distance, or the displacement amount of the accelerator pedal 8 is not more than a preset amount (low load state). For example, the remaining driving distance may be calculated, based on the value of the SOC of the battery unit 60, the amount of fuel oil which can be supplied to the engine 71, or a cumulative driving distance in a period which passes from a time point when the utility vehicle 1 was fed with the fuel oil most recently to a current time.

The above stated low load state refers to a state in which either one of the front and rear motors 20 and 30 is actuated to lessen a driving power loss and suppress heat generation in the motors 20 and 30, and the inverters 42 and 52, in view of a mechanical driving loss, or efficiency of the motors 20 and 30, and the inverters 42 and 52. This state is found preliminarily from an experiment or the like. If it is determined that the economical driving condition is met (YES in step S3), the target torque determiner 43a sets the target torque of one of the front and rear motors 20 and 30 to zero. The target torque determiner 43a determines the target torque of the other of the front and rear motors 20 and 30 with reference to a map similar to a driving torque map as described below (step S4: determine target torque for economical driving).

When the utility vehicle 1 is driven by using only one of the front and rear motors 20 and 30 as described above, economical driving with a lesser energy loss is realized, but drivability may be limited. As a solution to this, if the displacement amount of the accelerator pedal 8 is greater than a predetermined amount even when the remaining driving distance is not more than the preset distance, the front and rear wheels 2 and 3 may be driven by using both of the front and rear motors 20 and 30. By driving both of the front and rear wheels 2 and 3 as necessary, even in the middle of the economical driving, a driving mobility unique to the four-wheel-drive vehicle is attained.

On the other hand, if it is determined that the economical driving condition is not met (step S3: NO), the target torque determiner 43a determines the target torque of the front motor 20 and the target torque of the rear motor 30, with reference to driving torque maps electronically stored in a memory (step S5). The driving torque maps contain suitable target torque values of the front motor 20 and target torque values of the rear motor 30, respectively corresponding to accelerator displacement amounts and vehicle speeds, for example, which values are found by experiment or the like. The vehicle speed may be calculated, based on the signal from the encoder 20a of the front motor 20 and the signal from the encoder 30a of the rear motor 30.

In the driving torque maps, the driving torque of the front motor 20 and the driving torque of the rear motor 30 may be set to different values, according to the vehicle states of the utility vehicle 1. As the vehicle states, the vehicle speed, acceleration, deceleration, lateral acceleration indicating how the utility vehicle 1 is turning, etc., may be used. The vehicle states may include the displacement amount of the accelerator pedal 8, the displacement amount of the brake pedal 9, the displacement speed of the accelerator pedal 8, the displacement speed of the brake pedal 9, a slip state of the front wheels 2, a slip state of the rear wheels 3, etc. According to these vehicle states, the magnitude of the driving torque of the front wheels 2 and the magnitude of the driving torque of the rear wheels 3 may be changed, thereby implementing suitable driving action control and improving the driving feeling.

To be specific, in the driving torque maps, the target torque of the front wheels 2 and the target torque of the rear wheels 3 may be set to greater values as the accelerator displacement amount becomes greater. Or, the target torque of the front wheels 2 and the target torque of the rear wheels 3 may be set to relatively greater values as the vehicle speed becomes higher, in view of a higher driving resistance. By comparison, when the vehicle speed is higher, the target torques may be set to relatively smaller values according to an increase in the vehicle speed, because there arises a need for suppressing the attitude of the utility vehicle 1 from becoming unstable.

For example, the target torque value read from the driving torque map may be greater for the rear wheels 3 side and smaller for the front wheels 2 side as the acceleration of the utility vehicle 1 becomes greater. During acceleration, vertical load (contact or ground load) at the rear wheels 3 side increases because of shifting of the load. Therefore, if the ratio of the allocation of the torque applied to the rear wheels 3 side is set greater, the driving mobility of the utility vehicle 1 can be enhanced, and the attitude of the utility vehicle 1 can be stabilized. It may be determined that the utility vehicle 1 is accelerated, based on, for example, the accelerator displacement amount, or the fact that an increase rate of the displacement amount is not less than a predetermined amount.

The target torque value read from the driving torque map may be changed based on how the utility vehicle 1 is turning (state of turning of the utility vehicle 1). For example, the torque of the front motor 20 may be set greater when the utility vehicle 1 is turning. By doing so, the driver can feel that the utility vehicle 1 is steered effectively, and enjoy an improved driving feeling. Note that, if the vehicle speed is higher than a predetermined value, the torque of the rear motor 30 may be set greater, to stabilize the attitude of the utility vehicle 1 being turning.

It may be determined how the utility vehicle 1 is turning based on the degree to which the handle 6 is steered by the driver, or based on lateral acceleration. In that case, the utility vehicle 1 may be provided with a sensor for detecting a steering angle of the handle 6 or a sensor for detecting the lateral acceleration. Or, the utility vehicle 1 may be provided with a sensor for detecting a rotational speed difference between the right and left wheels (either one of or both of the front wheels 2 and the rear wheels 3), and it may be determined how the utility vehicle 1 is turning, based on the output of the sensor.

The rotational speed of the front motor 20 and the rotational speed of the rear motor 30 may be detected based on the signal from the encoder 20a and the signal from the encoder 30a, respectively. If one of the front wheels 2 and the rear wheels 3 slip, the target torque value of the wheels 2(3) which are slipping may be decreased, and the target torque value of the wheels 2(3) which are not slipping may be increased, either one of which may occur or both of which may occur. By doing so, the slip of the wheels can be suppressed and the driving mobility of the utility vehicle 1 can be enhanced.

In brief, if one of the front wheels 2 and the rear wheels 3 slip, at least either decreasing the target torque value of the wheels 2(3) which are slipping, or increasing the target torque value of the wheels 2(3) which are not slipping, is performed. In other words, the target torque value of one of the wheels 2 and 3 is set smaller than the target torque value of the other wheels 2(3). In the same manner, if both of the front wheels 2 and the rear wheels 3 are slipping, the target torque value of the wheels which are slipping with a greater slip ratio may be set smaller than the target torque value of the wheels which are slipping with a smaller slip ratio. In brief, the ratio of the allocation of the driving torque in the utility vehicle 1 may be set greater for the wheels with a smaller slip ratio.

After the target torque of the front motor 20 and the target torque of the rear motor 30 are determined (step S4, step S5), the front and rear motors 20 and 30 are controlled by using the inverter 42 of the front motor driver 40 and the inverter 52 of the rear motor driver 50, respectively so that the front and rear motors 20 and 30 output the determined target torques, respectively (step S6: drive control of motor). Thereby, the front motor 20 and the rear motor 30 are respectively independently supplied with the electric power and their torques are independently controlled. As a result, driving mobility unique to the four-wheel-drive vehicle can be achieved even in a road surface condition, for example, a snowy road surface or a sandy road surface, in which a friction coefficient is very low.

—Control of Engine Electric Generator—

In step S7, the mode selector 43c determines whether or not the EV mode should be selected, based on the signal from the mode input device 16, the value of the SOC of the battery unit 60, etc. (S7: EV mode?). It is determined as YES when the EV mode is selected by the driver using the mode input device 16 and the value of the SOC of the battery unit 60 is not less than a predetermined lower limit value. On the other hand, it is determined as NO when the HV mode is selected by the driver using the mode input device 16 and the value of the SOC of the battery unit 60 is less than the predetermined lower limit value.

If it is determined as YES and the mode selector 43c selects the EV mode in step S7, and if it is determined that the engine electric generator 70 is activated to generate electric power (YES in step S8), the mode selector 43c sends an engine stop command to the controller 83 of the S/G controller 80, to stop the operation of the engine electric generator 70 (step S9). In response to this engine stop command, the controller 83 fully closes the throttle valve of the engine 71 and stops the feeding of the fuel and the ignition of the air-fuel mixture. As a result, the running of the engine 71 stops.

On the other hand, if it is determined as NO and the mode selector 43c selects HV mode in step S7, and if it is determined that the engine 71 is in a stopped state (YES in step S10), the mode selector 43c sends an engine start command to the controller 83 of the S/G controller 80, to start the engine 71 (step S11). In response to this engine start command, the controller 83 causes the electric generator 72 of the engine electric generator 70 to operate as the motor. Thereby, the engine 71 starts cranking, feeding the fuel, and the ignition of the air-fuel mixture. In this way, the engine 71 starts.

When the EV mode is selected (YES in step S7) and the engine 71 is in a stopped state (NO in step S8), the engine 71 maintains its state. When the HV mode is selected (NO in step S7) and the engine 71 is running (NO in step S10), the engine 71 maintains its state.

As described above, the control mode switches to the HV mode, as necessary, in which case the engine electric generator 70 is activated to supplementarily supply the electric power to the front and rear motors 20 and 30. In the HV mode, reduction of the value of the SOC of the battery unit 60 is lessened, and the distance over which the utility vehicle 1 is going to drive from now can be increased significantly. Since the control mode switches to the HV mode while monitoring the value of the SOC of the battery unit 60, the battery unit 60 is prevented from discharging to an excessive level, and thus, the life of the batteries can be extended. Since the EV mode or the HV mode is fundamentally selected in response to the driver's operation of the mode input device 16, the driver's intention is reflected well in selection of the mode.

—Regenerative Braking—

Next, a control procedure of regenerative braking will be described. If step S2 is determined as NO (accelerator OFF) in the flowchart of FIG. 5, it is determined whether or not the utility vehicle 1 is in a stopped state in step S12. For example, if the vehicle speed is lower than a predetermined small value (e.g., 2~3 km/h), it is determined that the utility vehicle 1 is in a stopped state (YES in step S12), and the process returns to step S1. On the other hand, if it is determined that the vehicle speed is not lower than the predetermined value (NO in step S12), it is determined whether or not the brake pedal 9 has been depressed by the driver, based on the signal from the brake switch 9a (step S13: brake ON?).

If it is determined as NO (brake OFF), it may be estimated that the driver has released the accelerator pedal 8 but does not depress the brake pedal 9 yet. In this case, the target torque determiner 43a sets the corresponding target torque to a negative value such that its absolute value is a relatively small value to achieve a braking torque substantially equal in magnitude to a typical engine braking force so that at least one of the front motor 20 and the rear motor 30 is placed in a regenerative braking mode (step S14).

Hereinafter, for clarity of description, the negative target torque in the regenerative braking is referred to as a target braking torque and its value is assumed to be an absolute value. For example, the value of the target braking torque corresponding to brake-OFF, which is substantially equal in magnitude to the typical engine braking force, is found by an experiment, etc., and may be electronically stored in the memory of the master controller 43. The value may be set to a constant value, or may be set in the form of a map or a table such that the value is greater as the vehicle speed is higher, or smaller as the vehicle speed is higher.

The value of the target braking torque corresponding to brake-OFF may be set different between the front motor 20 and the rear motor 30 according to the vehicle states of the utility vehicle 1 including the vehicle speed. For example, when the vehicle speed is not lower than the predetermined value, the target braking torque may be set to an equal value for the front motor 20 and the rear motor 30, while when the vehicle speed is lower than the predetermined value, the target braking torque of the front motor 20 may be set to a greater value, and the target braking torque of the rear motor 30 may be set to a smaller value, according to a decrease in the vehicle speed. Or, when the vehicle speed is lower than the predetermined value, the target braking torque of the rear motor 30 may be set to zero, and only the front motor 20 may generate the braking torque.

If it is determined as YES (brake ON) in step S13, in step S15, the target torque determiner 43d of the master controller 43 determines the value of the target braking torque as a value greater than a value in the state of the brake-OFF. This increases efficiency of the regenerative braking, and increases the braking torque applied to the front wheels 2 and the braking torque applied to the rear wheels 3. Since the front and rear motors 20 and 30 have high responsiveness to control, and the regenerative braking torque generated in the motors 20 and 30 increases quickly, the driver can feel that the braking force is increasing, upon the driver's operation for depressing the brake pedal 9.

The value of the target braking torque determined in response to the driver's operation of the brake pedal 9 may be made different between the front motor 20 and the rear motor 30. For example, the target torque determiner 43a determines the target braking torque of the front motor 20 and the target braking torque of the rear motor 30, with reference to braking torque maps electronically stored in the memory. These braking torque maps contain suitable braking torque values of the front motor 20 and suitable braking torque values of the rear motor 30, respectively, corresponding to brake displacement amounts and vehicle speeds, for example, which values are found by experiment or the like.

In the braking torque maps of the front motor 20 and the rear motor 30, for example, the target braking torque of the front motor 20 may be set greater than the target braking torque of the rear motor 30, and the target braking torque of the front motor 20 and the target braking torque of the rear motor 30 may increase as the brake displacement amount increases. The target braking torque of the front motor 20 and the target braking torque of the rear motor 30 may be set greater as the vehicle speed is higher.

In the present embodiment, the same drum brake units are used as the service brakes 19 for all of the front and rear wheels 2 and 3. If the ratio of the allocation of the regenerative braking torque to the front motor 20 is set greater as described above, the braking torque applied to the front wheels 2 can be set greater than the braking torque applied to the rear wheels 3, along with the braking forces generated by the service brakes 19. This results in a natural braking feeling. In addition, during the braking, the vertical load (ground or contact load) of the front wheels 2 increases because of a shifting of the load. Therefore, if the ratio of the allocation of the braking torque applied to the front wheels 2 is set greater, the attitude of the utility vehicle 1 can be stabilized even in a slippery road surface condition such as a snowy road surface condition. In addition, the kinetic energy can be recovered effectively at the front wheels 2 side where the ground load tends to increase.

In the braking torque maps of the front motor 20 and the rear motor 30, the values of target braking torques may be set not to change according to the magnitude of the vehicle speed. Or, the ratio of the allocation of the braking torque to the front and rear motors 20 and 30 may be changed according to the magnitude of the vehicle speed. For example, the ratio of the allocation of the regenerative braking torque to the front motor 20 may be set greater, as the vehicle speed is higher. Or, the value of the target braking torque of the rear motor 30 may be set to zero, and only the front motor 20 may generate the braking torque when the vehicle speed is not lower than a predetermined value.

Furthermore, the target braking torque value read from the braking torque map may be changed according to the vehicle states of the utility vehicle 1. For example, the ratio of the allocation of the braking torque to the front motor 20 may be set greater as deceleration of the utility vehicle 1 becomes greater. Or, the ratio of the allocation of the braking torque to the front motor 20 may be set greater when the utility vehicle 1 is turning than when the utility vehicle 1 not turning, in order to stabilize the attitude of the utility vehicle 1 during the braking.

For example, during a state where the brake is OFF, only one of the front and rear motors 20 and 30 (preferably front motor 20) may perform regenerative braking, and thereafter both of the front and rear motors 20 and 30 may perform regenerative braking, upon the brake being ON. When both of the motors 20 and 30 perform regenerative braking, the magnitude of the braking torque of the front motor 20 may be set comparatively greater.

When the target torque determiner 43a of the master controller 43 determines the target braking torque value of the front motor 20 or the target braking torque value of the rear motor 30 (step S14, step S15), the front motor 20 is controlled by using the inverter 42 of the front motor driver 40, and the rear motor 30 is controlled by using the inverter 52 of the rear motor driver 50 (step S16: regenerative braking control of the motor). To be specific, at least one of front motor 20 and rear motor 30 rotates by the force applied by the front wheels 2 or the rear wheels 3, to operate as the AC electric generator. The generated AC power is supplied to the inverter 42(52), via the AC lines 41(51). The inverter 42(52) converts the AC power into DC power which is charged into the battery unit 60.

During the above operation, it is determined whether or not the engine electric generator 70 is activated to generate electric power (step S17). If YES in step S17, the controller 83 of the S/G controller 80 controls the inverter 82 so that the power generation operation of the electric generator 72 is stopped, and the controller 83 controls the throttle valve opening degree of the engine 71, to gradually decrease the engine speed to an idling engine speed (step S18). The power generation operation of the electric generator 72 (engine electric generator 70) is stopped, to improve efficiency with which the kinetic energy can be recovered by the front motor 20 or the rear motor 30.

When the utility vehicle 1 is stopped and the vehicle speed is lower than the predetermined value in step S12, the engine electric generator 70 may be activated as necessary, to charge the battery unit 60, if the key switch 15 is not turned OFF after a predetermined time passes.

As described above, in the present embodiment, the utility vehicle 1 includes the electric motors 20 and 30 for driving the front wheels 2 and the rear wheels 3, respectively, the target torque of the front motor 20 and the target torque of the rear motor 30 are determined based on at least the depressing operation of the accelerator pedal 8, and the front motor 20 and the rear motor 30 are controlled by the front motor driver 40 and the rear motor driver 50, respectively, to output their target torques.

In a case where one of the front wheels 2 and the rear wheels 3 slip in a slippery road surface condition such as a snowy road surface condition, a desired driving torque is applied to the other wheels which are not slipping, without decreasing the magnitude of the driving torque applied to the wheels being slipping. That is, the driving torque is fundamentally applied to each of the front wheels 2 and the rear wheels 3, in response to the driver's depressing operation of the accelerator pedal 8, etc., and as a result, high driving mobility unique to the four-wheel-drive wheel and a natural driving feeling are achieved.

More often than not, the utility vehicle 1 drives in the slippery road surface condition. If a wheel slip occurs, the driving torque is adjusted by the driver's depressing operation of the accelerator pedal 8. Since the driving torque is applied to each of the front wheels 2 and the rear wheels 3, in response to the driver's depressing operation of the accelerator pedal 8, while permitting some slip. Thus, a natural driving feeling is achieved.

In the present embodiment, the ratio of the allocation of the driving torque applied to the front wheels 2 and to the rear wheels 3 in response to the driver's operation is changed in multiple levels according to the vehicle states. Thus, a natural driving feeling is achieved.

In the utility vehicle 1 of the present embodiment, to ensure driving mobility on a sandy road or in a swampy area, the front wheels 2 and the rear wheels 3 are attached with balloon tires, respectively. The balloon tires tend to dent easily and the outer diameter of the wheels tends to change easily. For this reason, in speed control of the motors 20 and 30, a problem associated with a detection error of the wheel speed arises. To correct the error, control would become complicated. However, the preset embodiment is intended for torque control of the motors 20 and 30. Therefore, a problem associated with the detection error will not arise, irrespective of easy control.

In the present embodiment, the front motor 20 and the rear motor 30 drive the right and left front wheels 2 and the right and left rear wheels 3 via the transaxles 21 and 31 (differential gear mechanisms), respectively, which can simplify the control. This is because the ratio of torque allocation in the forward and rearward direction is changed by the control, but torque allocation in the rightward and leftward direction is substantially performed by the differential gear mechanisms.

Furthermore, in the utility vehicle 1 of the present embodiment, the ratio of the allocation of the braking torque applied to the front wheels 2 and to the rear wheels 3 is changed in multiple levels in the braking control. This makes it possible to achieve effective kinetic energy recovery and a natural driving feeling. Moreover, by reducing the capacity of the service brake 19, cost reduction can be achieved.

-Other Embodiment-

The above embodiment is merely exemplary, and is in no way intended to limit the present invention, its applications and uses. Although the motor 20(30) is switched between driving of the wheels 2(3) and regenerative braking in response to ON/OFF of the accelerator pedal 8 in the present embodiment, the present invention is not limited to this. The motor 20(30) may generate the driving torque when the displacement amount of the accelerator pedal 8 is not less than a reference displacement amount which is a degree to which the accelerator pedal 8 is depressed slightly, and may generate the braking torque by regenerative braking when the displacement amount of the accelerator pedal 8 is less than the reference displacement amount.

In the present embodiment, a rotational speed sensor may be provided to detect the rotational speed of each of the right and left front wheels 2 and the right and left rear wheels 3, and the vehicle speed of the utility vehicle 1 may be detected based the output of the sensor.

Although in the present embodiment, the magnitude of the driving torque and the magnitude of the braking torque applied to the front and rear wheels 2 and 3 may be made different according to the vehicle states of the vehicle 1, the timing at which the torque is applied may be made different.

For example, when the electric power supply to the front and rear motors 20 and 30 starts, for example, when the utility vehicle 1 is starting, a time lag may be set between start of the front motor 20 and the start for the rear motor 30, for example, the rear motor 30 may start first, to prevent the battery unit 60 from discharging with a great magnitude. This also prevents rapid starting effectively.

In the present embodiment, since the rear motor 30, the motor drivers 40 and 50, and the S/G controller 80 are accommodated in the engine room of the utility vehicle 1, they may be damaged by heat radiated from the engine electric generator 70. Because of this, upon the engine electric generator 70 being activated, the front motor 20 drives the front wheels 2 with a priority, and the rear motor 30 may be actuated in the least amount of occasions. Also, when one of the motor drivers 40 and 50 is higher in temperature than the other by a predetermined value or greater, the target torque of the motor controlled by the motor driver 40 or 50 which is higher in temperature may be set smaller than the target torque of the motor controlled by the motor driver 40 or 50 which is lower in temperature.

Figure 6:
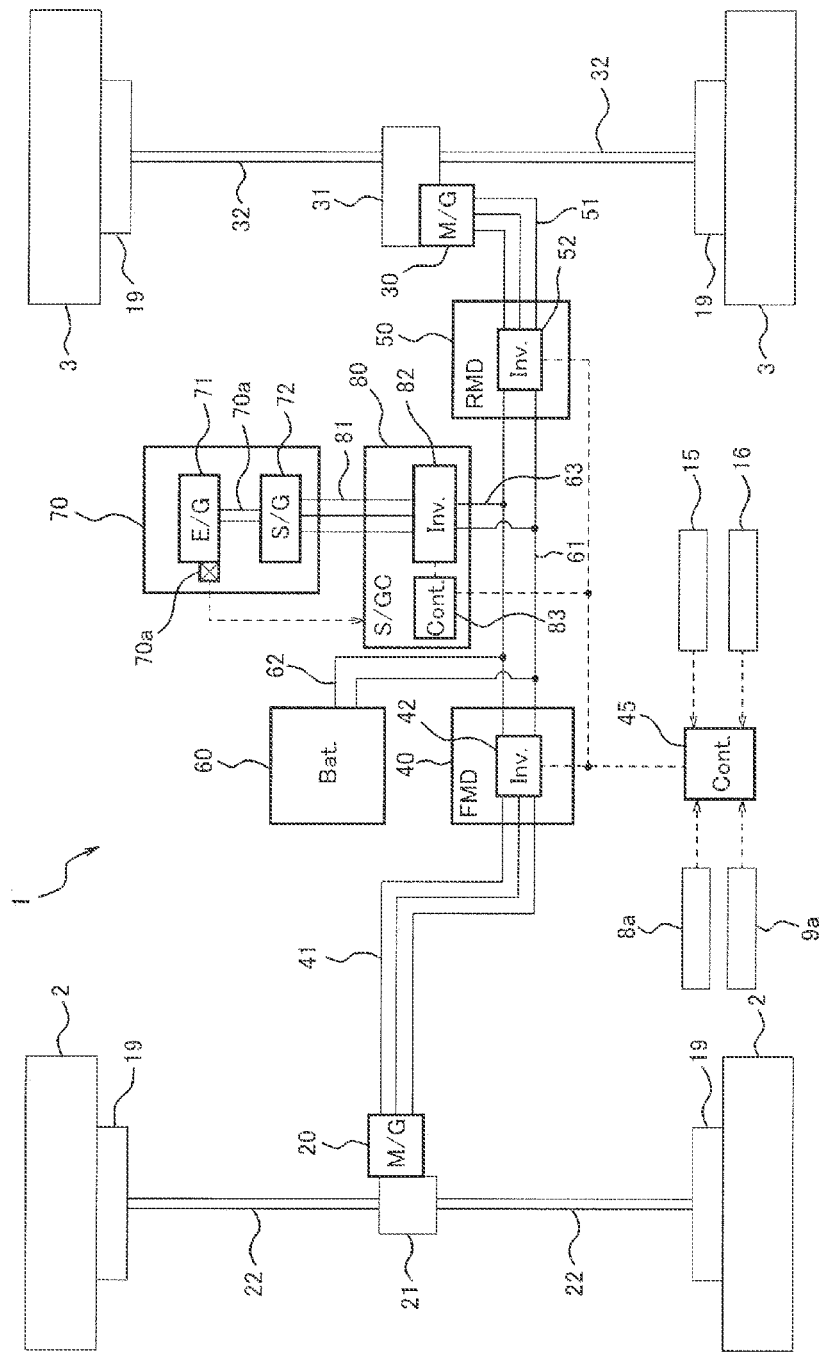
FIG. 6 is a block diagram schematically showing a drive control system according to an alternative embodiment.

Although in the present embodiment, the front motor driver 40 includes the inverter 42 and the controller 43 and the rear motor driver 50 includes the inverter 52 and the controller 53, the present invention is not limited to this. For example, as shown in FIG. 6, the front and rear controllers 43 and 53 may be integrated into a controller 45 separate from the inverters 42 and 52.

In the utility vehicle 1 provided with the cargo bed 18 of a great size at the rear portion of the vehicle body 4, the ratio of the allocation of the driving torque applied to the front wheels 2 and to the rear wheels 3 may be changed based on the presence/absence of luggage loaded on the cargo bed 18 or its weight. For example, the ratio of the allocation of the driving torque applied to the rear wheels 3 may be increased as the weight of the luggage increases. The weight of luggage loaded on the cargo bed 18 may be calculated based on the output of a pneumatic sensor attached to the rear wheels 3.

In the case where the balloon tires which tend to dent easily are used as the front wheels 2 and the rear wheels 3 as in the present embodiment, the ratio of the allocation of the torque applied to the wheels which dent to a greater degree may be set greater, in view of a change in a pneumatic pressure of the tires or the influence of the luggage loaded on the cargo bed 18.

In the present embodiment, if the control system corresponding to one of the front and rear motors 20 and 30 fails, only the remaining motor 20(30) may be controlled. If the utility vehicle 1 gets stuck, it may get out of the stuck state, by rotating the front and rear motors 20 and 30 in opposite directions.

In a case where the utility vehicle 1 is moving rearward, one of the front and rear motors 20 and 30 (front motor 20 is preferable) drives the wheels to move the vehicle body 4 rearward, and the remaining motor 20(30) may be placed in a regenerative braking mode. By doing so, even if the driver depresses the accelerator pedal 8 to an excessive level by mistake during rearward moving, an increase in the vehicle speed of the utility vehicle 1 moving rearward can be suppressed, and safety can be improved.

If the accelerator pedal 8 and the brake pedal 9 are depressed simultaneously, the driving torque of one of the front and rear motors 20 and 30 (rear motor 30 is preferable) is controlled, and the remaining motor 20(30) may be placed in the regenerative braking mode. In this case, the braking torque may be controlled according to the displacement amount of the brake pedal 9.

During the braking of the utility vehicle 1, the regenerative braking may be inhibited, for example, when the value of the SOC is great, to prevent the battery unit 60 from being charged excessively by the regenerative braking. In that case, however, the degree of the braking is changed, which makes the driver feel discomfort.

For example, when the value of the SOC is not less than a predetermined value and the brake is ON, during the braking, the front motor 20 may perform regenerative braking, whereas the rear motor 30 may output the driving torque. By reducing the output torque of the rear motor 30, the driving torque of the rear wheels 3 can be cancelled by applying the service brake 19. Since a great regenerative braking torque can be attained at the front wheels 2 side where the vertical load (contact or ground load) tends to increase, desired regenerative braking can be attained, and the battery unit 60 can be suppressed from being charged excessively.

The utility vehicle 1 is not limited to the vehicle of the present embodiment, which converts the kinetic energy into the electric energy and charges it into the battery unit 60. For example, connectable/separable fly wheels may be mounted to the drive systems of the front and rear wheels 2 and 3, and may be rotated to store energy by an inertia force during the braking. Or, a hydraulic pump and an accumulator may be coupled to each of the drive systems of the front and rear wheels 2 and 3, and the hydraulic pump may be actuated to store a hydraulic pressure in the accumulator, during the braking.

Although the utility vehicle 1 of the present embodiment accommodates the engine electric generator 70, the rear motor 30, the rear transaxle 31, the front motor driver 40, the rear motor driver 50, the S/G controller 80, and others, in the engine room provided in the rear portion of the vehicle body 4, the present invention is not limited to this. Alternatively, the motor drivers 40 and 50, and the S/G controller 80 may be accommodated in a space other than the engine room. In a further alternative, the engine room may be positioned at the front portion of the vehicle body 4.

Although in the present embodiment, the utility vehicle 1 (multi-purpose vehicle) has been described so far as an example of the electric vehicle, the electric vehicle may be an all terrain vehicle (ATV), a two-wheeled vehicle, or a three-wheeled vehicle. The electric vehicle is not limited to the series hybrid vehicle, but may be a parallel hybrid vehicle, a series-parallel hybrid vehicle, or an electric vehicle which is not equipped with an engine electric generator.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric vehicle comprising:
a front motor for driving right and left front wheels;
a rear motor for driving right and left rear wheels;
a target torque determiner for determining a target torque of the front motor and a target torque of the rear motor, based on at least a displacement amount of an accelerator operation member operated by a driver; and
a motor controller for controlling the front motor and the rear motor to cause the front motor to output the target torque and the rear motor to output the target torque, wherein when one of the front wheels or the rear wheels slip when all the wheels are driven by the front motor and the rear motor, the target torque determiner decreases the target torque of one of the front motor or the rear motor for driving the one of the front wheels or the rear wheels which are slipping and increases the target torque of the other of the front motor or the rear motor for driving the other of the front wheels or the rear wheels which are not slipping.

2. The electric vehicle according to claim 1, wherein the front motor is configured to drive the front wheel via a differential gear mechanism which couples the right and left front wheels to each other, and the rear motor is configured to drive the rear wheel via a differential gear mechanism which couples the right and left rear wheels to each other.

3. The electric vehicle according to claim 1, wherein if both of the front wheels and the rear wheels are slipping, the target torque determiner determines the target torque of each of the front motor and the rear motor such that a driving torque of the wheels which are slipping with a greater slip ratio is set smaller than a driving torque of the wheels which are slipping with a smaller slip ratio.

4. The electric vehicle according to claim 1, wherein the front wheels are steering wheels; and
when the target torque is a braking torque, the target torque determiner determines the target torque of each of the front motor and the rear motor such that a ratio of allocation of the braking torque to the front motor is set greater when the vehicle is turning than a brake torque when the vehicle is not turning.

5. The electric vehicle according to claim 1, wherein if a vehicle speed is higher than a predetermined value, the target torque determiner determines the target torque of each of the front motor and the rear motor such that the target torque of the rear motor is set greater when the vehicle is turning than a torque when the vehicle is not turning.

6. The electric vehicle according to claim 1, further comprising:
a cargo bed provided at a rear portion of the vehicle,
wherein the target torque determiner determines the target torque of each of the front motor and the rear motor such that a ratio of allocation of a driving torque applied to the rear wheels is increased as a weight of a luggage on the cargo bed increases.

7. The electric vehicle according to claim 1, wherein the target torque determiner determines the target torque of each of the front motor and the rear motor such that a driving torque of the rear wheel is greater as an acceleration of the electric vehicle is greater.

8. The electric vehicle according to claim 1, wherein when the target torque is a braking torque, the target torque determiner determines the target torque of each of the front motor and the rear motor such that the braking torque of the front motor is set greater than the braking torque of the rear motor.

9. The electric vehicle according to claim 1, wherein when the target torque is a braking torque, the target torque determiner determines the target torque of each of the front motor and the rear motor such that a ratio of allocation of the braking torque to the front motor is set greater as a deceleration of the electric vehicle is greater.

10. The electric vehicle according to claim 1, wherein when the target torque is a braking torque, the target torque determiner divides the braking torque evenly between the target torque of each of the front motor and the rear motor when a vehicle speed is not lower than a predetermined value, and the target torque determiner sets the target torque of the front motor to equal the braking torque such that only the front motor generates the braking torque when the vehicle speed is lower than the predetermined value.

11. The electric vehicle according to claim 1, wherein when the target torque is a braking torque, the target torque determiner divides the braking torque evenly between the target torque of each of the front motor and the rear motor when a vehicle speed is not lower than a predetermined value, and the target torque determiner divides the braking torque such that the target torque of the front motor is set to a greater value than a value of the target torque of the rear motor when the vehicle speed is lower than the predetermined value.

12. The electric vehicle according to claim 1, further comprising:
an engine electric generator for supplying an electric power to the front motor and the rear motor,
wherein when the engine electric generator is activated, one of the front motor or the rear motor which one is farther from the engine electric generator relative to the other of the front motor or the rear motor drives the wheels with a priority over the other of the front motor or the rear motor.

13. An electric vehicle comprising:
a front motor for driving right and left front wheels;
a rear motor for driving right and left rear wheels;
a target torque determiner for determining a target torque of the front motor and a target torque of the rear motor, based on at least a displacement amount of an accelerator operation member operated by a driver; and
a motor controller for controlling the front motor and the rear motor to cause the front motor to output the target torque and the rear motor to output the target torque, wherein when one of the front wheels or the rear wheels slip when all the wheels are driven by the front motor and the rear motor, the target torque determiner increases the target torque of one of the front wheels or the rear wheels for driving the other of the front wheels or the rear wheels which are not slipping.

14. An electric vehicle comprising:
a front motor for driving right and left front wheels;
a rear motor for driving right and left rear wheels;
a target torque determiner for determining a target torque of the front motor and a target torque of the rear motor, based on at least a displacement amount of an accelerator operation member operated by a driver; and
a motor controller for controlling the front motor and the rear motor to cause the front motor to output the target torque and the rear motor to output the target torque, wherein when one of the front wheels or the rear wheels slip when all the wheels are driven by the front motor and the rear motor, the target torque determiner changes a ratio of torque allocation of the target torque of the front motor and the target torque of the rear motor by decreasing the target torque of one of the front motor or the rear motor for driving the one of the front wheels or the rear wheels which are slipping and increasing the target torque of the other of the front motor or the rear motor for driving the other of the front wheels or the rear wheels which are not slipping.

* * * * *